(12) United States Patent
Lauffer (10) Patent No.: US 8,925,586 B2
(45) Date of Patent: Jan. 6, 2015

(54) DIRECT DRIVE SERVOVALVE HAVING REDUNDANT DRIVE MOTORS

(75) Inventor: John Lauffer, Santa Clarita, CA (US)

(73) Assignee: Woodward HRT, Inc., Santa Clara, CA (US)

(*) Notice: Subject to any disclaimer, the term of this patent is extended or adjusted under 35 U.S.C. 154(b) by 496 days.

(21) Appl. No.: 13/383,972

(22) PCT Filed: Jul. 14, 2010

(86) PCT No.: PCT/US2010/041956
§ 371 (c)(1),
(2), (4) Date: Jan. 13, 2012

(87) PCT Pub. No.: WO2011/008844
PCT Pub. Date: Jan. 20, 2011

(65) Prior Publication Data
US 2012/0112109 A1    May 10, 2012

Related U.S. Application Data (60) Provisional application No. 61/225,294, filed on Jul. 14, 2009.

(51) Int. Cl.
*F16K 31/04*      (2006.01)

(52) U.S. Cl.
CPC ............................... *F16K 31/047* (2013.01)
USPC .............. 137/625.65; 251/129.11; 251/229; 251/289

(58) Field of Classification Search
USPC ................. 251/129.11–129.13, 229, 289; 137/596.17, 625.25, 625.65
See application file for complete search history.

(56) References Cited

U.S. PATENT DOCUMENTS

| | | | | |
|---|---|---|---|---|
| 2,648,313 A | * | 8/1953 | Clifton | 137/625.25 |
| 4,176,687 A | * | 12/1979 | Ensign | 137/625.65 |
| 4,530,487 A | * | 7/1985 | Tew et al. | 251/129.2 |
| 4,793,377 A | * | 12/1988 | Haynes et al. | 137/625.65 |
| 4,794,845 A | * | 1/1989 | Vick | 137/625.65 |
| 6,334,604 B1 | * | 1/2002 | Roth | 251/129.11 |
| 6,923,212 B2 | * | 8/2005 | Tranovich et al. | 137/625.65 |
| 2002/0112760 A1 | * | 8/2002 | Goni Usabiaga | 137/243.6 |
| 2005/0247350 A1 | * | 11/2005 | Coakley et al. | 137/554 |
| 2009/0072083 A1 | * | 3/2009 | Hanlon et al. | 310/114 |
| 2009/0133767 A1 | * | 5/2009 | Coakley | 137/625.65 |

FOREIGN PATENT DOCUMENTS

| | | |
|---|---|---|
| DE | 4447395 A1 | 6/1996 |
| EP | 1116908 A1 | 7/2001 |
| EP | 1863154 A2 | 12/2007 |
| JP | 01238758 | 9/1989 |
| JP | 03113156 | 5/1991 |

(Continued)

*Primary Examiner* — John Bastianelli
(74) *Attorney, Agent, or Firm* — BainwoodHuang (57) ABSTRACT

A direct drive servovalve (10) includes redundant drive motors (14) coupled to a common valve drive shaft (22,24) by a connection device (26). The connection device (26) is configured to allow operation of the servovalve (10) in the case where one or more of the drive motors (14) becomes inoperable, such as caused by jamming or binding of a rotor associated with the drive motor. By use of the connection device (26), in the event that one of the drive motors (14) was to become jammed, the remaining operable motors (14) can continue to stroke or cause translation of a valve member (18) of the direct drive servovalve (10) to allow its continued operation.

16 Claims, 4 Drawing Sheets

(56) References Cited

FOREIGN PATENT DOCUMENTS

| JP | 3129293 | 1/2007 |
| JP | 2008008470 | 1/2008 |
| WO | 9322195 | 11/1993 |
| WO | 0196749 A2 | 12/2001 |
| WO | 2009070358 A1 | 6/2009 |

* cited by examiner

DIRECT DRIVE SERVOVALVE HAVING REDUNDANT DRIVE MOTORS

CROSS REFERENCE TO RELATED APPLICATIONS

This Patent Application claims priority to U.S. Provisional Patent Application No. 61/225,294 filed on Jul. 14, 2009, entitled, "DIRECT DRIVE SERVOVALVE HAVING REDUNDANT DRIVE MOTORS", the contents and teachings of which are hereby incorporated by reference in their entirety.

BACKGROUND

Electronically controlled valve assemblies are utilized in the aerospace industry to control the flow and delivery of fluid through various aircraft systems. For example, conventional direct drive servovalves convert relatively low power electrical control input signals into a relatively large mechanical power output. During operation, pressurized fluid enters the direct drive servovalve and, based upon the control input signals, the servovalve drives a fluid actuator to operate variable-geometry elements such as those associated with an aircraft.

SUMMARY

In aerospace applications, conventional servovalves are configured with redundant components to allow continued operation of the servovalve in the event a portion of the servovalve fails. For example, conventional servovalves can include dual concentric control valves where a secondary control valve becomes operative in the event that a primary control fails or seizes within a fluid pathway sleeve of the servovalve.

It would be beneficial for a direct drive servovalve to include multiple motors to provide redundancy in the event that one or more of the motors were to fail. For example, a direct drive servovalve could include multiple motors connected to a single drive shaft to position a valve member between an open and closed position in order to control an amount of fluid flow within the servovalve. However, with multiple motors connected to a common shaft, in the event that one or more of the motor rotors were to become inoperable or jam, such inoperability can prevent the remaining functional motors from operating the drive shaft and valve member properly.

Embodiments of the present invention relate to a direct drive servovalve having redundant drive motors coupled to a common valve drive shaft by a connection device. The connection device is configured to allow operation of the servovalve in the case where one or more of the drive motors becomes inoperable, such as caused by jamming or binding of a rotor associated with the drive motor. By use of the connection device, in the event that one of the drive motors was to become jammed or immobilized, the remaining operable motors can continue to stroke or cause translation of a valve member of the direct drive servovalve to allow its continued operation. The connection device can be applied to small, low load designs as well as large, high load designs.

In one arrangement, a servovalve assembly includes a housing defining a fluid pathway, a valve member disposed within the fluid pathway the valve member having a common shaft, and a set of drive motors operatively coupled to the common shaft of the valve member with at least one drive motor of the set of motors coupled to the common shaft by a connection device, the connection device configured to allow positioning of the valve member within the fluid pathway by a subset of the drive motors when the at least one drive motors of the set of drive motors becomes inoperable.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

A direct drive servovalve includes redundant drive motors coupled to a common valve member drive shaft by a connection device. The connection device is configured to allow operation of the servovalve in the case where one or more of the drive motors becomes inoperable, such as caused by jamming or binding of a rotor associated with the drive motor. By use of the connection device, in the event that one of the drive motors was to become jammed, the remaining operable motors can continue to stroke or cause translation of a valve member of the direct drive servovalve to allow its continued operation. The connection device can be applied to small, low load designs as well as large, high load designs.

Figure 1:
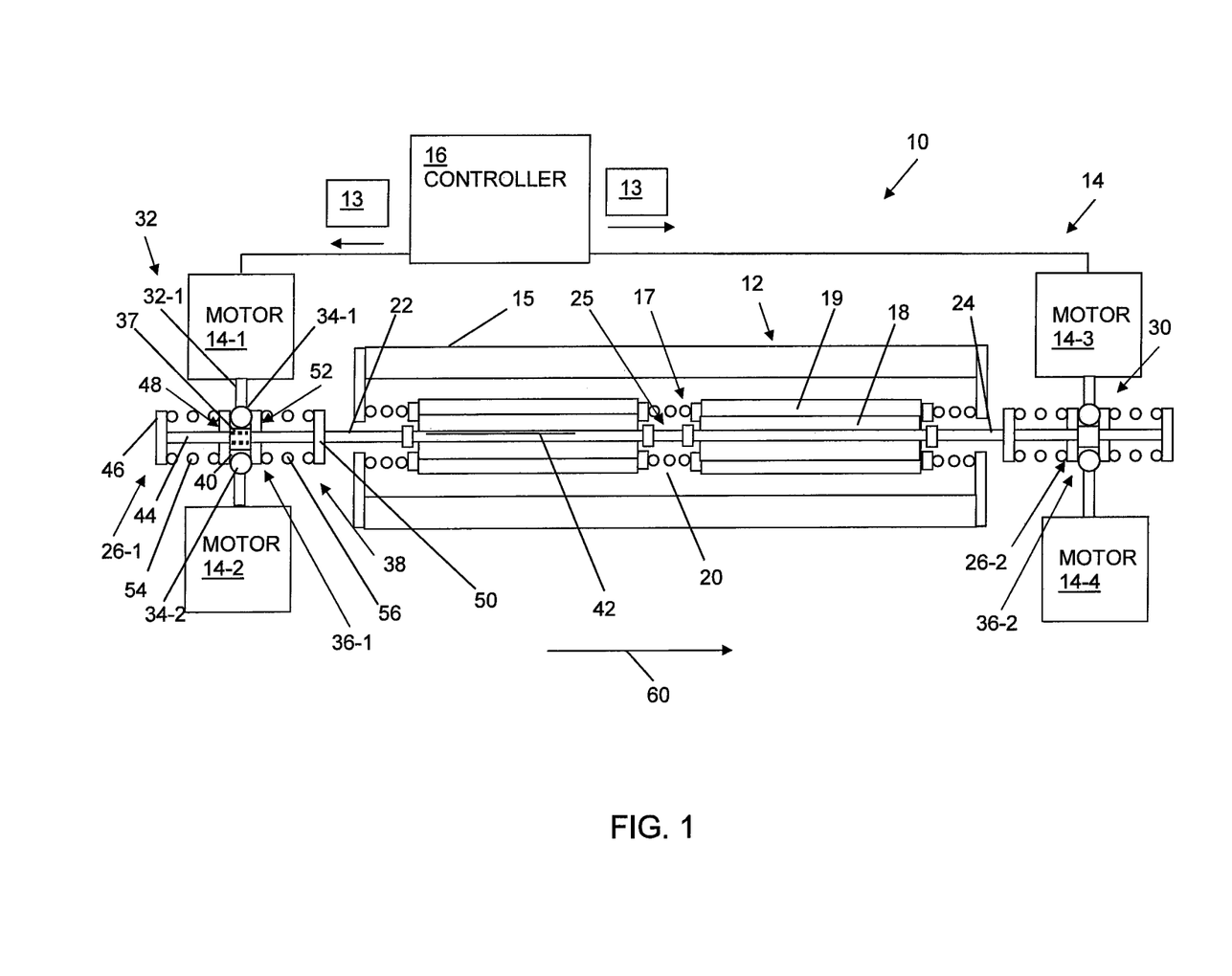
FIG. 1 illustrates a schematic representation of a servovalve, according to one embodiment.

FIG. 1 shows an arrangement of a direct drive servovalve assembly 10. The direct drive servovalve assembly 10 includes a dual concentric control valve 12, a set of drive motors 14, referenced herein as motors, and a controller 16, such as a processor and memory, configured to operate the set of motors 14 in order to control operation of the dual concentric control valve 12.

The dual concentric control valve 12 includes a housing 15 and a dual concentric valve member 17 disposed within a fluid pathway 20 defined by the housing 15. As illustrated the dual concentric valve member 17 includes a primary valve member or spool 18 and a second valve member or spool 19 where the primary valve member 18 is disposed within the second valve member 19 such that a longitudinal axis of the primary valve member 18 is substantially concentric with a longitudinal axis of the second valve member 19. As illustrated, the dual concentric control valve 12 also includes first and second control valve tie-rods 22, 24 which are coupled together to form a common shaft and configured to secure the dual concentric valve member 17 to the motors 14 via respective connection devices 26, as will be described in detail below.

During operation, the tie-rods 22, 24 are configured to translate the primary valve member 18 in a linear path along a longitudinal axis 42 of the control valve 12 to meter an amount of fluid flowing from a corresponding pressurized fluid source (not shown), through the fluid pathway 20 and to a hydraulic or fluid actuator (not shown). In the event that the primary valve member 18 were to become immobilized within the housing 15 such that the primary valve member 18 is incapable of translating along the longitudinal axis 42, the tie-rods 22, 24 are configured to translate the second valve member 19 along the longitudinal axis 42 relative to the primary valve member 18. In such an arrangement, the second valve member 19 operates as a back-up to the dual concentric valve member 17 in the event of failure of the primary valve member 18.

The set of motors 14 are configured to receive command signals 13 from the controller 16 and linearly position the dual concentric valve member 17 within the fluid pathway 20 and along the longitudinal axis 42 in response to the command signals 13. As illustrated, the set of drive motors 14 includes a first drive motor 14-1, a second drive motor 14-2, a third drive motor 14-3, and a fourth drive motor 14-4. Inclusion of the set of redundant drive motors 14 as part of the direct drive servovalve assembly 10 allows continued operation of the servovalve assembly 10 in the event that one or more of the individual motors 14-1 through 14-4 were to fail or to become inoperative. For example, in the case where first drive motor 14-1 becomes inoperative, the second, third, and fourth drive motors 14-2, 14-3, and 14-4 can continue to position the dual concentric valve valve member 17 within the fluid pathway 20 to allow operation of the servovalve assembly 10.

The set of motors 14 are configured to share a load associated with translating or stroking the dual concentric valve member 17 within the housing 14. For example, assume that application of about five pounds of force is required to linearly translate or drive the dual concentric valve member 17 within the housing 15. In the case where all four drive motors of the set of motors 14 are operational, each of the four motors 14 provides about 1.25 pounds force to drive the dual concentric valve member 17. In the event one of the drive motors, such as drive motor 14-1, were to become inoperable or jam, the remaining three operational drive motors 14-2, 14-3, and 14-4 would provide the total five pounds of force to linearly translate or drive the dual concentric valve member 17. In such a case, each of the three operational drive motors 14-2, 14-3, and 14-4 provide about 1.67 pounds force to drive the dual concentric valve member 17. Accordingly, each of the operating motors 14 shares the force needed to drive the load of the connection device 26 associated with the inoperable motor.

Each motor 14 includes a stator (not shown) and a rotor assembly 30. In response to particular currents passing through coils of the stator, the rotor assembly 30 is configured to rotate within a particular arc range. For example, in one arrangement, the rotor assembly 30 is configured to rotate within a predefined arc range of about +/−30 degrees in order to drive the dual concentric valve member 17 between a fully closed position and a fully open position within the fluid pathway 20 of the housing 12. With such a range of rotation, in one arrangement, each connection device 26 of the set of motors 14 is configured to drive the primary valve member 18 through about twice its stroke length (e.g., about 0.040 inches).

For example, during a testing procedure, to ensure operability of both the primary valve member 18 and the second valve member 19 an operator causes the rotor assembly 30 to rotate within a predefined arc range of about +/−30 degrees. With such rotation, up to about a single stroke length, the rotor assembly 30 causes the primary valve member 18 to translate along the longitudinal axis 42 of the control valve 42. Such translation is indicative of the operability of the primary valve member 18. As the rotor assembly 30 continues to rotate to drive the primary valve member 18 through about twice its stroke length, the rotor assembly 30 causes the primary valve member 18 to pick-up the second valve member 19, thereby causing the second valve member 19 to translate along the longitudinal axis 42 relative to the primary valve member 18. Such translation is indicative of the operability of the second valve member 19.

Figure 2:
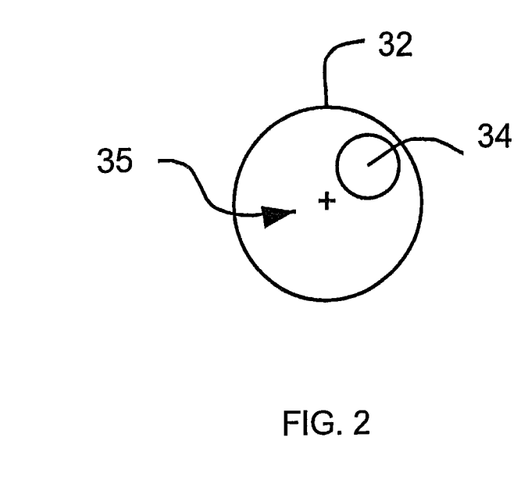
FIG. 2 illustrates a schematic representation of a rotor assembly of FIG. 1.

Each rotor assembly 30 includes a rotor shaft 32 and a valve member drive element 34 disposed at an end of the rotor shaft 32. While the valve member drive element 34 can be configured in a variety of ways, in one arrangement, as illustrated in FIG. 2, the valve member drive element 34 is configured as a ball coupled to the rotor shaft 32 at a location off-axis to an axis of rotation 35 of the rotor shaft 32. In use, as the rotor shaft 32 rotates about the axis of rotation 35, the valve member drive element 34 causes the dual concentric control valve 17 to translate within the fluid pathway 20 of the housing 15 along longitudinal axis 42.

Returning to FIG. 1, the connection devices 26 are configured to couple particular motors of the set of motors 14 to respective tie-rods 22, 24 of the dual concentric control valve 12. In one arrangement, first and second connection devices 26-1, 26-2 secure corresponding pairs of drive motors 14 to the first and second control valve tie-rods 22, 24. For example, as illustrated in FIG. 1, the first connection device 26-1 secures the first and second drive motors 14-1, 14-2 to the first tie-rod 22 and the second connection device 26-2 secures the third and fourth drive motors 14-3, 14-4 to the second tie-rod 24, the first and second tie-rods 22, 24 being coupled together, such as at location 25, illustrated in FIG. 1.

While the connection devices 26 can be configured in a variety of ways, in the embodiment illustrated in FIG. 1, and taking the first connection device 26-1 as an example (i.e., with the second connection device 26-2 being configured in a similar manner as the first connection device 26-1), the connection device 26-1 includes a motor coupling portion 36 and a connection device shaft 44 (hereinafter shaft 44). The motor coupling portion 36 is configured to couple the first and second motors 14-1, 14-2 to the first tie-rod 22 via the shaft 44. In one arrangement, the motor coupling portion 36 is configured as a disc structure that defines an opening 37 extending through a longitudinal axis of the disc structure and a channel 40 extending about an outer circumference of the disc structure. The opening 37 is sized such that when the shaft 44 mates with the motor coupling portion 36 via the opening 37, the motor coupling portion 36 can laterally translate along the longitudinal axis of the shaft 44 and can rotate about the longitudinal axis of the shaft 44. The channel 40 is configured to receive and secure the valve member drive element 34 for each of the first and second drive motors 14-1, 14-2 to the first tie-rod 22. For example, as illustrated, the valve member drive elements 34-1, 34-2 are carried within the channel 40 defined by the motor coupling portion 36.

Furthermore, the channel 40 is sized to allow rotation of the motor coupling portion 36-1 about the longitudinal axis of the shaft 44 and relative to the valve member drive elements 34-1, 34-2 during operation. For example, during operation, as the motors 14-1, 14-2 rotate the respective rotor shafts 32-1, 32-2, the rotor shafts 32-1, 32-2 position the valve member drive elements 34-1, 34-2 in an arc pattern along both a longitudinal direction (e.g., substantially parallel to the longitudinal axis 42) and along a lateral direction (e.g., into and out of the page of FIG. 1). However, because of dimensional tolerance differences in the positioning of the valve member drive elements 34-1, 34-2 relative to each other, the arc pattern movements of each of the valve member drive elements 34-1, 34-2 can be different from each other. Such a mismatch in arc pattern movements can typically cause binding of one or more of the drive elements 34-1, 34-2 with the motor coupling portion 36-1. By allowing rotation of the motor coupling portion 36-1 about the longitudinal axis of the shaft 44, the channel 40 allows for dimensional mismatches in the connection the drive motors 14-1, 14-2 to the motor coupling portion 36-1 and minimizes binding of the valve member drive elements 34-1, 34-2 with the motor coupling portion 36-1 during operation.

Additionally, during operation, each of the motors of the set of motors 14 can drive the dual concentric valve member 17 at different rates, thereby leading to force-fighting among the motors 14 (i.e., where one or more of the motors dominate driving of the dual concentric valve member 17 relative to the remaining motors. Such a mismatch in driving rates can typically cause binding of one or more of the drive elements 34-1, 34-2 with the motor coupling portion 36-1. By allowing rotation of the motor coupling portion 36-1 about the longitudinal axis of the shaft 44, the channel 40 allows for mismatches in the drive rates the drive motors 14-1, 14-2 to the motor coupling portion 36-1 and minimizes binding of the valve member drive elements 34-1, 34-2 with the motor coupling portion 36-1 during operation.

The connection devices 26 are also configured to allow continued operation of the dual concentric control valve 12 in the event that one of the drive motors 14 becomes inoperable or jammed. With such a configuration, the connection devices 26 allow the operable motors to actuate the valve member 17 within the fluid pathway 20. For example, in the embodiment illustrated in FIG. 1, and taking the first connection device 26-1 as an example (i.e., with the second connection device 26-2 being configured in a similar manner as the first coupling device 26-1), the connection device 26-1 includes a relief assembly 38 disposed on the shaft 44 relative to the motor coupling portion 36-1.

The relief assembly 38, as illustrated in the embodiment of FIG. 1, includes a first plate 46 secured to a first portion of the shaft 44 at a distance from a first face 48 of the motor coupling portion 36-1 and a second plate 50 secured to a second portion of the shaft 44 at a distance from a second face 52 of the motor coupling portion 36-1. The relief assembly 38 also includes a first load absorption portion 54, such as a first spring, disposed on the first shaft portion between the first plate 46 and the first face 48 of the motor coupling portion 36-1 as well as a second load absorption portion 56, such as a second spring, disposed on the second shaft portion between the second plate 56 and the second face 52 of the motor coupling portion 36-1.

Each of the first and second load absorption portions 54, 56 is configured to generate a preload between the motor coupling portion 36-1 and the respective plates 46, 50 in order to maintain the position of (e.g., a distance between) the motor coupling portion 36-1 relative to the plates 46, 50 when all of the drive motors 14 are operational. For example, in one arrangement, each of the first and second load absorption portions 54, 56 is configured to generate a 15 pound force preload between the motor coupling portion 36-1 (i.e., against the first and second faces 48, 52, respectively) and the first and second plates 46, 50. In the case where all four of the motors 14-1 through 14-4 are operational, each one of the motors 14 shares a load associated with translating or stroking the dual concentric valve member 17 within the housing 15 (e.g., each of the four motors 14 causes each of the valve member drive elements to generate a load of about 1.25 pounds force on the tie-rods 22, 24 to drive the dual concentric valve member 17). In such an arrangement, as the motors 14-1 through 14-4 translate or stroke the dual concentric valve member 17, the load generated by the drive motors 14-1 through 14-4 is less than the preload of either of the first and second load absorption portions 54, 56. Accordingly, during operation, the first and second load absorption portions 54, 56 maintain the position of the motor coupling portion 36-1 relative to the plates 46, 50.

Each of the first and second load absorption portions 54, 56 is also configured to become compressed between the motor coupling portion 36-1 and the first and second plates 46, 50, respectively, to allow the shaft 44 to longitudinally translate within the opening 37 of the motor coupling portion 36-1 and relative to the motor coupling portion 36-1 when one or more of the drive motors 14 becomes inoperable.

For example, assume the case where the first drive motor 14-1 becomes inoperable, such as caused by a rotor shaft 32 becoming jammed or non-rotatable relative to the motor's stator. Further assume that the remaining three drive motors 14-2, 14-3, and 14-4 have received a command 13 to stroke the dual concentric valve member 17 along direction 60. As the drive motors 14-2, 14-3, and 14-4 rotate their respective rotor shafts 32 and as the tie-rod 22 translates along direction 60, the valve member drive element 34-1 remains stationary (i.e., the rotor shaft 32-1 does not rotate relative to the motor stator). Accordingly, as the tie-rod 22 translates along longitudinal axis 42, the load generated by the valve member drive element 34-1 against the first load absorption portion 54 increases over time until the generated load becomes greater than the preload associated with the first load absorption portions 54.

Once the load generated between the valve member drive element 34-1 and the first load absorption portion 54 overcomes the preload associated with the first load absorption portion 54, the first plate 46 and shaft 44 translates along direction 60 relative to the motor coupling portion 36-1, thereby compressing the first load absorption portion 54 between the first plate 46 and the first face 48 of the motor coupling portion 36-1. With such compression of the first load absorption portion 54, the remaining operational drive motors 14-2, 14-3, and 14-4 can continue to position the dual concentric valve member 17 to a commanded position, regardless of the inoperability of the first drive motor. Accordingly, by use of the connection device 26, in the event that one of the drive motors 14 was to become jammed, the remaining operable motors can continue to stroke or cause translation of a dual concentric valve member 17 of the direct drive servovalve assembly 10 to allow its continued operation.

While various embodiments of the invention have been particularly shown and described, it will be understood by those skilled in the art that various changes in form and details may be made therein without departing from the spirit and scope of the invention as defined by the appended claims.

While FIG. 1 illustrates the inclusion of four motors 14 as part of the servovalve assembly 10, the set of motors 14 can include as few as two motors to provide redundancy.

As indicated above, the first and second load absorption portions 54, 56 generate a preload on the motor coupling portion 36 in order to minimize or prevent the shaft 44 from translating relative to the motor coupling portion 36 when all of the drive motors 14 are operational. In one arrangement, the preload generated by the first and second load absorption portions 54, 56 reduce the amount of free-play or soft spring deflection in the connection device 26. For example, in one arrangement, the first and second load absorption portions 54, 56 provide a soft spring deflection of a maximum of 0.0003 inches.

Additionally, in one arrangement, the connection device 26 allows periodic testing, such as via aircraft built in testing (BIT), of the direct drive servovalve assembly 10 to minimize a latent failure. The connection device 26 is configured so that it can be tested during aircraft BIT and verified operational. The connection device 26 is exercised to demonstrate functionality and then returns to its preset position. For example, the connection device 26 is configured to withstand in excess of 20,000 BIT operation cycles and is configured to return the valve 18 to center or null position, within 0.0005 inch after each BIT test.

Figure 3:
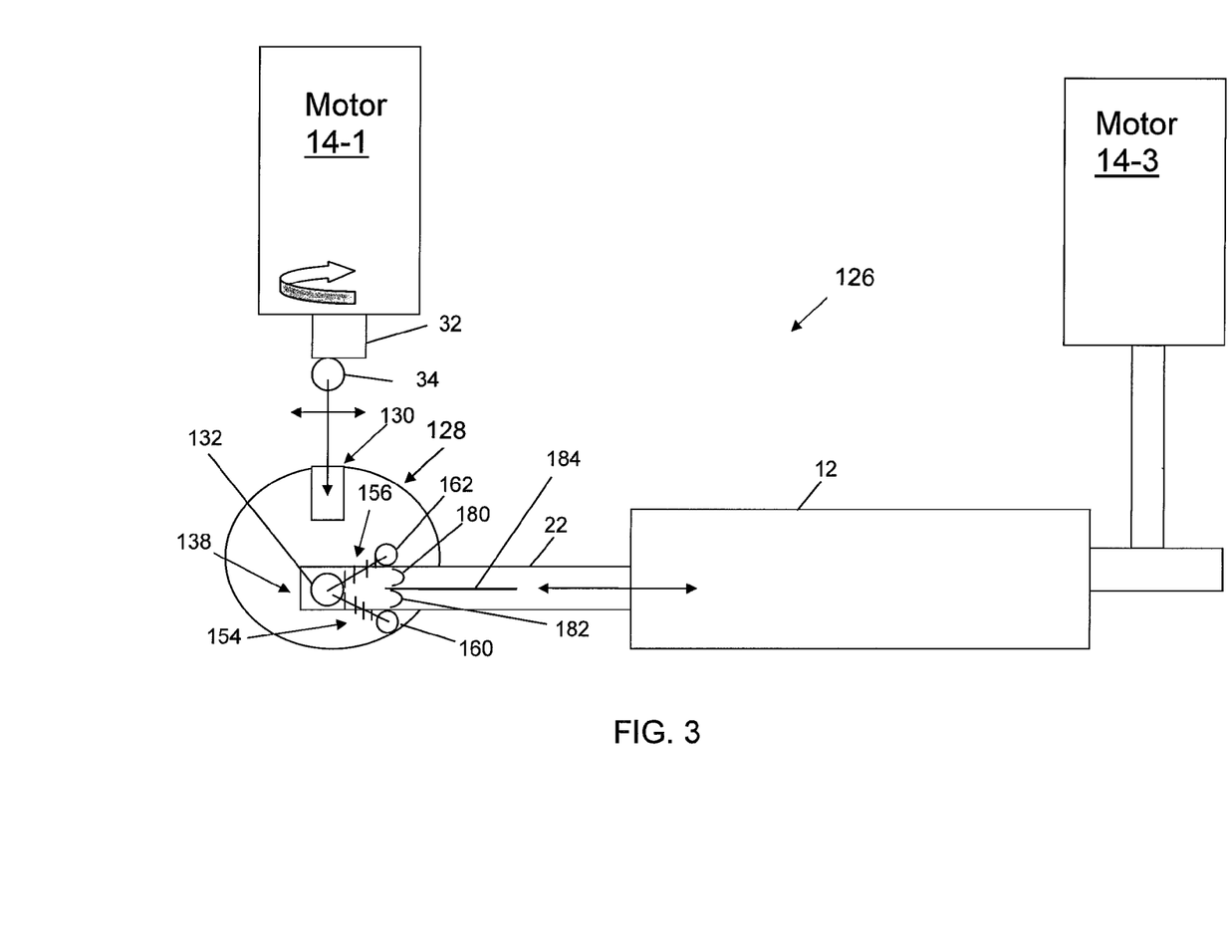
FIG. 3 illustrates a second schematic representation of a servovalve, according to one embodiment.

Also, as described above, the connection device 26-1 includes the first and second load absorption portions 54, 56, such as springs, to generate a preload on the motor coupling portion 36-1 and to allow the shaft 44 to translate relative to the motor coupling portion 36-1 when one or more of the drive motors 14 becomes inoperable. Such description is by way of example only. In one arrangement, the connection device 26-1 can be configured in a variety of ways. For example, with reference to FIG. 3, a connection device 126 includes a disc element 128 defining a slot 130 configured to receive and capture the valve member drive element 34 of the drive motor 14-1. The connection device 126 includes a pivot element 132 coupled to the tie-rod 22 as well as a relief assembly 138 having first and second load absorption portions 154, 156 (e.g., springs) disposed between the pivot element 132 and securing elements 160, 162 associated with the disc element 128. As illustrated, the first and second load absorption portions 154, 156 are disposed outside of the longitudinal axis 184 of the tie-rod 22 (i.e., the load path) so relatively higher loads can be applied through the connection device 126. For example, as illustrated in FIG. 3, the first load absorption portion 154 is disposed disposed at a first angle 180 relative to the longitudinal axis 184 and the second load absorption portion 182 is disposed at a second angle 182 relative to the longitudinal axis 184, the first angle 180 opposing the second angle 182 relative to the longitudinal axis 184.

In the case where the motors 14-1, 14-3 associated with a servovalve assemble 10 are functional, a preload associated with each of the first and second load absorption portions 154, 156 limit the disc element 128 from pivoting relative to the tie-rod 22 and allows the drive motors 14-1, 14-3 to translate the tie-rod 22 and associated spool relative to the control valve 12. In the case where the drive motor 14-1 becomes jammed or inoperable, operation of the drive motor 14-3 causes the tie-rod 22 to generate a load on the disc element 128. Once the generated load on the disc overcomes the preload on one of the first and second load absorption portions 154, 156, translation of the tie-rod 22 causes the disc element 128 to pivot about the pivot element 132, thereby allowing the operational drive motor 14-3 of the servovalve assembly the ability to translate the tie-rod 22 and associated valve member 17 relative to the control valve 12.

Additionally, while the connection device 126 is configured to pivot or tilt, the control device 126 can be configured to slide or bend at the connection point 132.

Figures 4, 5:
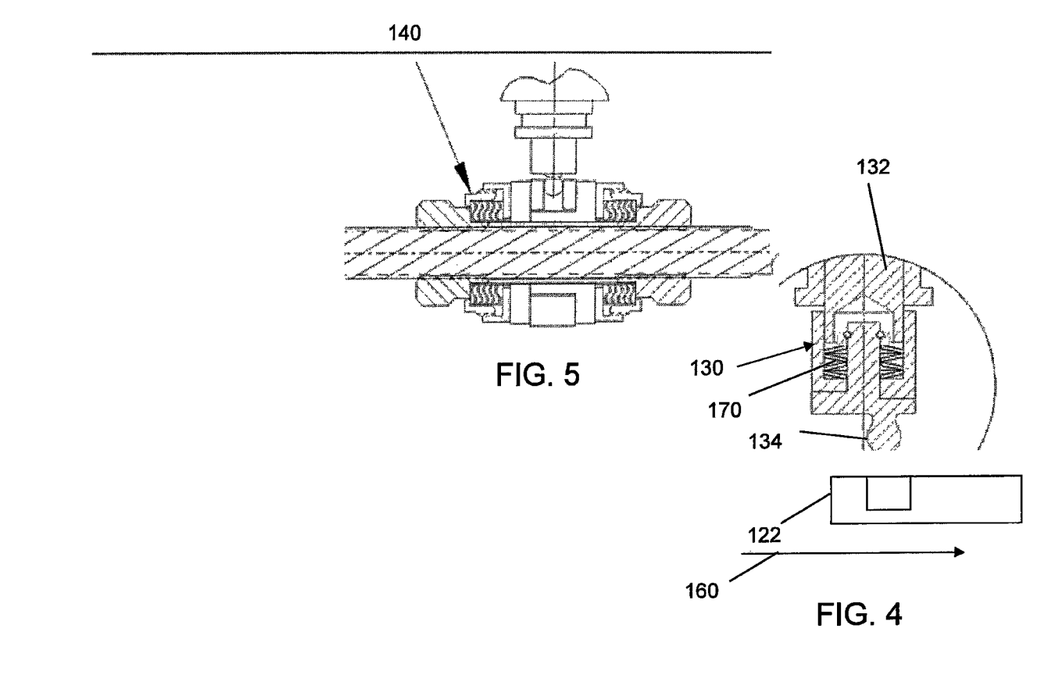
FIG. 4 illustrates an arrangement of a rotor assembly configured with a relief assembly, according to one embodiment.
FIG. 5 illustrates an arrangement of a tie-rod configured with a relief assembly, according to one embodiment.

As indicated above, the connection device 26 is described as a component that connects the rotor assembly 30 of a motor 14 to a tie-rod 22, 24 associated with a valve member 17 where the connection device 26 is separate and distinct from the rotor assembly 30. Such indication is by way of example only. In one arrangement, the connection device 26 is integrally formed as part of the rotor assembly 30. For example, as illustrated in FIG. 4, a load absorption portion 170, such as a spring, forms part of a rotor assembly 130. For example, the load absorption portion 170 couples a valve member drive element 134 to a rotor shaft 132 and is configured to generate a preload between the valve member drive element 134 and the rotor shaft 132 in order to maintain the relative position of the valve member drive element 134 and the rotor shaft 132 when all of the drive motors 14 are operational. In the event that the rotor shaft 132 were to become jammed (i.e., if the motor were to become inoperable), the load absorption portion 170 allows the valve member drive element 134 to rotate relative to the rotor shaft 132 in response to a load applied by a tie-rod 122 along direction 160, via operational motors 14.

As indicated above, the connection assembly 28 is described as connecting the rotor assembly 30 of a motor to a tie-rod 22 associated with a valve member 17. In one arrangement, the tie-rod 22 is configured with a relief assembly 38 to slide, compress, or collapse in response to one of the motors 14 becoming inoperable, such as indicated in FIG. 5. For example, the tie-rod 22 can include an integrally formed bellows structure 140 configured to expand or collapse in response to application of a load resulting from failure of a motor 14.

What is claimed is:

1. A servovalve assembly, comprising:
   a housing defining a fluid pathway;
   a valve member disposed within the fluid pathway the valve member having a common shaft; and
   a set of drive motors operatively coupled to the common shaft of the valve member with at least one drive motor of the set of motors coupled to the common shaft by a connection device, the connection device configured to allow positioning of the valve member within the fluid pathway by a subset of the drive motors when the at least one drive motor of the set of drive motors becomes inoperable;
   wherein the connection device comprises:
   a connection device shaft coupled to the common shaft of the valve member;
   a motor coupling portion slidably disposed on the connection device shaft, the motor coupling portion configured to couple a rotor assembly of the at least one drive motor to the common shaft; and
   a relief assembly carried by the connection device shaft, the relief assembly configured to allow the remaining drive motor of the set of motors to position the valve member within the fluid pathway when the at least one drive motor of the set of drive motors becomes inoperable.

2. The servovalve assembly of claim 1, wherein the relief assembly comprises:
   at least one plate secured to a first portion of the connection device shaft at a distance from an opposing face of the motor coupling portion; and
   at least one load absorption portion disposed on the connection device shaft between the at least one plate and the opposing face of the motor coupling portion.

3. The servovalve assembly of claim 2, wherein the at least one load absorption portion comprises a spring configured to (i) generate a preload between the motor coupling portion and the at least one plate to maintain the distance between the motor coupling and the at least one plate when the at least one drive motor of the set of drive motors is operational and (ii) become compressed between the motor coupling portion and the at least one plate when the at least one drive motor of the set of drive motors is inoperable.

4. The servovalve assembly of claim 1, wherein the relief assembly comprises:
   a first plate disposed on a first portion of the connection device shaft at a distance from a first face of the motor coupling portion;
   a second plate disposed on a second portion of the connection device shaft at a distance from a second face of the motor coupling portion, the second portion of the connection device shaft opposing the first portion of the connection device shaft;

a first load absorption portion disposed on the first portion of the connection device shaft between the first plate and the first face of the motor coupling portion; and a second load absorption portion disposed on the second portion of the connection device shaft between the second plate and the second face of the motor coupling portion.

5. The servovalve assembly of claim 4, wherein:
the first load absorption portion comprises a spring configured to (i) generate a preload between the motor coupling portion and the first plate to maintain the distance between the motor coupling and the first plate when the at least one drive motor of the set of drive motors is operational and (ii) become compressed between the motor coupling portion and the first plate when the at least one drive motor of the set of drive motors is inoperable; and the second load absorption portion comprises a spring configured to (i) generate a preload between the motor coupling portion and the second plate to maintain the distance between the motor coupling and the second plate when the at least one drive motor of the set of drive motors is operational and (ii) become compressed between the motor coupling portion and the second plate when the at least one drive motor of the set of drive motors is inoperable.

6. The servovalve assembly of claim 1, wherein the connection device is configured as a disc structure and defines a channel disposed substantially about the circumference of the disc structure, the channel configured to capture at least a portion of a rotor assembly of the at least one drive motor.

7. A servovalve assembly, comprising:
a housing defining a fluid pathway;
a valve member disposed within the fluid pathway the valve member having a common shaft; and
a set of drive motors operatively coupled to the common shaft of the valve member with at least one drive motor of the set of motors coupled to the common shaft by a connection device, the connection device configured to allow positioning of the valve member within the fluid pathway by a subset of the drive motors when the at least one drive motor of the set of drive motors becomes inoperable;
wherein the connection device is integrally formed with a rotor assembly of the at least one drive motor; and
wherein the connection device comprises: a load absorption portion, a valve member drive element, and a rotor shaft, the load absorption portion configured to (i) generate a preload between the valve member drive element and the rotor shaft to maintain a relative position between the valve member drive element and the rotor shaft when the at least one drive motors of the set of drive motors is operational and (ii) allow rotation of the valve member drive element relative to the rotor shaft when the at least one drive motors of the set of drive motors is inoperable.

8. The servovalve assembly of claim 1, wherein the connection device is integrally formed with the common shaft of the valve assembly.

9. The servovalve assembly of claim 8, wherein the integrally formed connection device comprises a bellows structure dispose within at least a portion of the common shaft.

10. A servovalve assembly, comprising:
a housing defining a fluid pathway;
a valve member disposed within the fluid pathway and coupled to a shaft; and
a set of drive motors, at least one pair of drive motors of the set of drive motors coupled to the valve member by a connection device, the connection device having a motor coupling portion disposed on the shaft, the motor coupling portion configured to secure the set of drive motors to the shaft, and a relief assembly having a first plate disposed on a first portion of the shaft at a distance from a first face of the motor coupling portion and a second plate disposed on a second portion of the shaft at a distance from a second face of the motor coupling portion and the relief assembly including a first load absorption portion disposed on the first shaft portion between the first plate and the first face of the motor coupling portion and a second load absorption portion disposed on the second shaft portion between the second plate and the second face of the motor coupling portion;

wherein the connection device is configured as a disc structure and defines a channel disposed substantially about the circumference of the disc structure, the channel configured to capture at least a portion of a rotor assembly of the at least one drive motor.

11. A servovalve assembly having a connection device for at least one drive motor, the connection device comprising:
a connection device shaft coupled to a common shaft of a valve member of the servovalve assembly;
a motor coupling portion slidably disposed on the connection device shaft, the motor coupling portion configured to couple a rotor assembly of the at least one drive motor to the common shaft; and
a relief assembly carried by the connection device shaft, the relief assembly configured to allow the remaining drive motor of the set of motors to position the valve member within the fluid pathway when the at least one drive motor of the set of drive motors becomes inoperable.

12. The connection device of claim 11, wherein the relief assembly comprises:
at least one plate secured to a first portion of the connection device shaft at a distance from an opposing face of the motor coupling portion; and
at least one load absorption portion disposed on the connection device shaft between the at least one plate and the opposing face of the motor coupling portion.

13. The connection device of claim 12, wherein the at least one load absorption portion comprises a spring configured to (i) generate a preload between the motor coupling portion and the at least one plate to maintain the distance between the motor coupling and the at least one plate when the at least one drive motor of the set of drive motors is operational and (ii) become compressed between the motor coupling portion and the at least one plate when the at least one drive motor of the set of drive motors is inoperable.

14. The connection device of claim 11, wherein the relief assembly comprises:
a first plate disposed on a first portion of the connection device shaft at a distance from a first face of the motor coupling portion;
a second plate disposed on a second portion of the connection device shaft at a distance from a second face of the motor coupling portion, the second portion of the connection device shaft opposing the first portion of the connection device shaft;

a first load absorption portion disposed on the first portion of the connection device shaft between the first plate and the first face of the motor coupling portion; and a second load absorption portion disposed on the second portion of the connection device shaft between the second plate and the second face of the motor coupling portion.

15. The connection device of claim 14, wherein:

the first load absorption portion comprises a spring configured to (i) generate a preload between the motor coupling portion and the first plate to maintain the distance between the motor coupling and the first plate when the at least one drive motor of the set of drive motors is operational and (ii) become compressed between the motor coupling portion and the first plate when the at least one drive motor of the set of drive motors is inoperable; and the second load absorption portion comprises a spring configured to (i) generate a preload between the motor coupling portion and the second plate to maintain the distance between the motor coupling and the second plate when the at least one drive motor of the set of drive motors is operational and (ii) become compressed between the motor coupling portion and the second plate when the at least one drive motor of the set of drive motors is inoperable.

16. The connection device of claim 11, wherein the connection device is configured as a disc structure and defines a channel disposed substantially about the circumference of the disc structure, the channel configured to capture at least a portion of a rotor assembly of the at least one drive motor.

* * * * *

UNITED STATES PATENT AND TRADEMARK OFFICE
CERTIFICATE OF CORRECTION

PATENT NO. : 8,925,586 B2
APPLICATION NO. : 13/383972
DATED : January 6, 2015
INVENTOR(S) : John Lauffer It is certified that error appears in the above-identified patent and that said Letters Patent is hereby corrected as shown below:

Title Page, at (73), Assignee "Santa Clara, CA" should be --Santa Clarita, CA--.

In the Claims

Claim 7, Column 9, Line 57, "motors" should read --motor--.

Claim 7, Column 9, Line 60, "motors" should read --motor--.

Signed and Sealed this
Twenty-ninth Day of September, 2015

Michelle K. Lee
*Director of the United States Patent and Trademark Office*